(12) United States Patent
Shim et al.

(10) Patent No.: US 9,904,119 B2
(45) Date of Patent: Feb. 27, 2018

(54) DISPLAY DEVICE AND METHOD OF MANUFACTURING THE SAME

(71) Applicant: Samsung Display Co. Ltd., Yongin (KR)

(72) Inventors: Yi Seop Shim, Suwon-si (KR); E Su Kim, Seoul (KR); Hee Ra Kim, Seoul (KR); Jun Woo Lee, Seongnam-si (KR); Chang Soon Jang, Seoul (KR); Chul Huh, Yongin-si (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 60 days.

(21) Appl. No.: 14/989,776

(22) Filed: Jan. 6, 2016

(65) Prior Publication Data

US 2017/0010496 A1  Jan. 12, 2017

(30) Foreign Application Priority Data

Jul. 10, 2015 (KR) .................. 10-2015-0098103

(51) Int. Cl.
*G02F 1/1339* (2006.01)
*G02F 1/1335* (2006.01)

(52) U.S. Cl.
CPC .... *G02F 1/13394* (2013.01); *G02F 1/133512* (2013.01); *G02F 2001/13396* (2013.01); *G02F 2001/13398* (2013.01)

(58) Field of Classification Search
CPC .................................................. G02F 1/13394
See application file for complete search history.

(56) References Cited

U.S. PATENT DOCUMENTS

2011/0299002 A1* 12/2011 Won ...................... G02B 5/201
349/43

FOREIGN PATENT DOCUMENTS

| JP | 11212075 | 8/1999 |
|---|---|---|
| JP | 2002258267 | 9/2002 |
| JP | 2011022448 | 2/2011 |
| KR | 1020020026100 | 4/2002 |
| KR | 1020100127538 | 12/2010 |

* cited by examiner

*Primary Examiner* — Edmond Lau
(74) *Attorney, Agent, or Firm* — Cantor Colburn LLP

(57) ABSTRACT

A display device includes: a first substrate; a second substrate disposed opposite to the first substrate; a light blocking pattern disposed on the first substrate; and a column spacer which is disposed on the first substrate and maintains a distance between the first substrate and the second substrate, where the light blocking pattern and the column spacer are spaced apart from each other, and the column spacer has an island shape surrounded by the light blocking pattern.

7 Claims, 30 Drawing Sheets

DISPLAY DEVICE AND METHOD OF MANUFACTURING THE SAME

This application claims priority to Korean Patent Application No. 10-2015-0098103 filed on Jul. 10, 2015 and all the benefits accruing therefrom under 35 U.S.C. § 119, the content of which in its entirety is incorporated herein by reference.

BACKGROUND

1. Field

The invention relates to a display device and a method of manufacturing the display device.

2. Description of the Related Art

Generally, a liquid crystal display device includes an array substrate, a counter substrate facing the array substrate, and a liquid crystal layer interposed between the array substrate and the counter substrate. Recently, a high-transmittance liquid crystal display device employing a color-filter on array ("COA") substrate in which a color filter is formed on an array substrate has been developed. In such a high-transmittance liquid crystal display device employing a COA substrate, in misalignment may occur during the bonding process of the COA substrate and a counter substrate provided with a light blocking member. To prevent such a misalignment, a black matrix on array ("BOA") substrate in which a light blocking member is formed on a COA substrate has been developed. Moreover, a shading holing member (black column spacer ("BCS")) which simultaneously forms a light blocking pattern and a column spacer for maintaining the distance between the light blocking pattern and the substrate with the same material has also been developed.

SUMMARY

When the column spacer and the light blocking pattern are integrally formed at the same time using a halftone mask, the critical dimension ("CD") bias of the column spacer may increase due to the exposure intensity of a halftone portion, compared to when only the column spacer is formed alone. That is, the difference between the designed size of the mask and the actual size of the column spacer may increase. Similarly, in a high-transmittance liquid crystal display device employing a color-filter on array ("COA") substrate, when the CD bias of the column spacer increases, the size of a black column spacer ("BCS") pattern increases, and thus a high resolution may not be effectively realized.

Aspects of the invention provide a display device, in which the size of a BCS pattern is decreased, and a method of manufacturing the display device.

According to an embodiment of the invention, a display device includes: a first substrate; a second substrate disposed opposite to the first substrate; a light blocking pattern disposed on the first substrate; and a column spacer which is disposed on the first substrate and maintains a distance between the first substrate and the second substrate, where the light blocking pattern and the column spacer are spaced apart from each other, and the column spacer has an island shape surrounded by the light blocking pattern.

In an embodiment, a distance between the light blocking pattern and the column spacer may be in a range of about 2 micrometers (µm) to about 10 µm.

In an embodiment, when a space between the light blocking pattern and the column spacer is viewed in plan, an outer boundary and an inner boundary of the space may have a circular shape.

In an embodiment, when a space between the light blocking pattern and the column spacer is viewed in plan, an outer boundary of the space may have a circular shape, and an inner boundary of the space may have a polygonal shape.

In an embodiment, when a space between the light blocking pattern and the column spacer is viewed in plan, an outer boundary and an inner boundary of the space may have a polygonal shape.

In an embodiment, when a space between the light blocking pattern and the column spacer is viewed in plan, an outer boundary of the space may have a polygonal shape, and an inner boundary of the space may have a circular shape.

In an embodiment, the column spacer may include a main column spacer and a sub column spacer, and an end of the main column spacer adjacent to the second substrate may be closer to the second substrate than an end of the sub column spacer adjacent to the second substrate is.

According to another embodiment of the invention, a display device includes: a first substrate; a second substrate disposed opposite to the first substrate r; a light blocking pattern disposed on the first substrate; and a column spacer which is disposed on the first substrate and maintains a distance between the first substrate and the second substrate; and a connecting member which is disposed between the light blocking pattern and the column spacer and is connected to the light blocking pattern and the column spacer.

In an embodiment, a height of the column spacer may be greater than a height of the light blocking pattern, and the height of the light blocking pattern may be greater than a height of the connection member.

In an embodiment, the connecting member has a width in a range of about 2 µm to about 10 µm.

In an embodiment, when the connecting member is viewed in plan, an outer boundary of the connecting member may have a circular shape or a polygonal shape, and an inner boundary of the connecting member may have a circular shape or a polygonal shape.

In an embodiment, the column spacer may include a main column spacer and a sub column spacer, and an end of the main column spacer adjacent to the second substrate may be closer to the second substrate than an end of the sub column spacer adjacent to the second substrate is.

According to another embodiment of the invention, a method of manufacturing a display device includes: providing a light blocking film on a substrate of the display device; and patterning the light blocking film using an exposure mask including an open portion, a first halftone portion and a blocking portion to simultaneously form a light blocking pattern and a column spacer. In such an embodiment, the light blocking pattern and the column spacer are spaced apart from each other, and the column spacer has an island shape surrounded by the light blocking pattern. In such an embodiment, a light transmittance of the open portion is higher than a light transmittance of the first halftone portion, and the light transmittance of the first halftone portion is higher than a light transmittance of the blocking portion. In such an embodiment, a main column spacer of the column spacer is formed by the open portion, the light blocking pattern is formed by the first halftone portion, and the first halftone portion and the open portion are spaced from each other by the blocking portion.

In an embodiment, a distance between the light blocking pattern and the column spacer may be in a range of about 2 µm to about 10 µm.

In an embodiment, the exposure mask may further include a second halftone portion, a light transmittance of the second halftone portion is higher than the light transmittance of the first halftone and may be lower than the light transmittance of the open portion, a sub column spacer of the column spacer may be formed by the second halftone portion, the first halftone portion and the second halftone portion may be spaced from each other by the blocking portion.

In an embodiment, a height of the main column spacer may be higher than a height of the sub column spacer.

In an embodiment, when a space between the light blocking pattern and the main column spacer or between the light blocking pattern and the sub column spacer is viewed in plan, an outer boundary and an inner boundary of the space may have a circular shape.

In an embodiment, when a space between the light blocking pattern and the main column spacer or between the light blocking pattern and the sub column spacer is viewed in plan, an outer boundary of the space may have a circular shape, and an inner boundary of the space may have a polygonal shape.

In an embodiment, when a space between the light blocking pattern and the main column spacer or between the light blocking pattern and the sub column spacer is viewed in plan, an outer boundary and an inner boundary of the space may have a polygonal shape.

In an embodiment, when a space between the light blocking pattern and the main column spacer or between the light blocking pattern and the sub column spacer is viewed in plan, an outer boundary of the space may have a polygonal shape, and an inner boundary of the space may have a circular shape.

BRIEF DESCRIPTION OF THE DRAWINGS

The above and other features of the invention will become more apparent by describing in detail exemplary embodiments thereof with reference to the accompanying drawings, in which.

DETAILED DESCRIPTION

Figure 1:
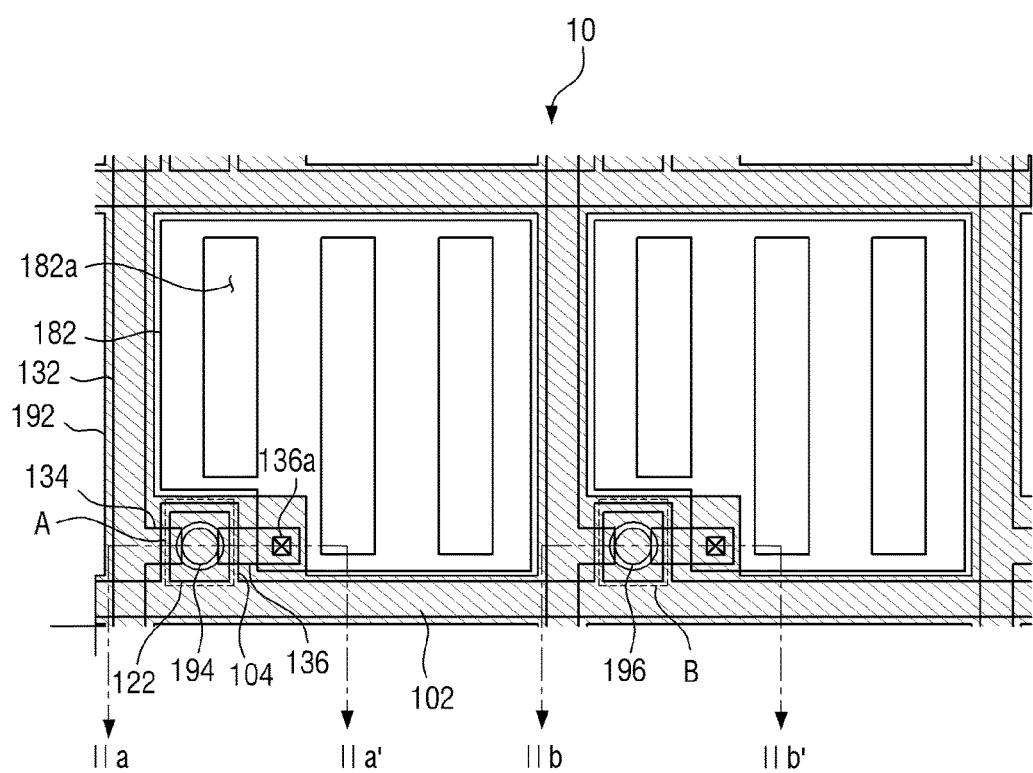
FIG. 1 is a plan view of a liquid crystal display device according to an embodiment of the invention.

Reference will now be made in detail to exemplary embodiments, examples of which are illustrated in the accompanying drawings, wherein like reference numerals refer to like elements throughout. In this regard, the exemplary embodiments may have different forms and should not be construed as being limited to the descriptions set forth herein. Accordingly, the exemplary embodiments are merely described below, by referring to the figures, to explain aspects of the description.

The description that one element is connected to or coupled to another element includes both a case where the one element is directly connected to the another element or a case where further another element is interposed between the elements. However, the description that one element is directly connected or directly coupled to another element indicates that there is no further another element between the elements. The term "and/or" includes any and all combinations of one or more of the associated listed items.

The terminology used herein is for the purpose of describing particular embodiments and is not intended to be limiting. As used herein, the singular forms, "a," "an," and "the" are intended to include the plural forms as well, unless the context clearly indicates otherwise. Moreover, the terms "comprises," "comprising," "includes," and/or "including," when used in this specification, specify the presence of stated features, integers, steps, operations, elements, components, and/or groups thereof, but do not preclude the presence or addition of one or more other features, integers, steps, operations, elements, components, and/or groups thereof.

Various exemplary embodiments are described herein with reference to sectional illustrations that are schematic illustrations of idealized exemplary embodiments and/or intermediate structures. As such, variations from the shapes of the illustrations as a result, for example, of manufacturing techniques and/or tolerances, are to be expected. Thus, exemplary embodiments disclosed herein should not be construed as limited to the particular illustrated shapes of regions, but are to include deviations in shapes that result from, for instance, manufacturing. The regions illustrated in the drawings are schematic in nature and their shapes are not intended to illustrate the actual shape of a region of a device and are not intended to be limiting.

It will be understood that, although the terms "first," "second," "third" etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region,"

"layer" or "section" discussed below could be termed a second element, component, region, layer or section without departing from the teachings herein.

Furthermore, relative terms, such as "lower" or "bottom" and "upper" or "top," may be used herein to describe one element's relationship to another element as illustrated in the Figures. It will be understood that relative terms are intended to encompass different orientations of the device in addition to the orientation depicted in the Figures. In an exemplary embodiment, when the device in one of the figures is turned over, elements described as being on the "lower" side of other elements would then be oriented on "upper" sides of the other elements. The exemplary term "lower," can therefore, encompasses both an orientation of "lower" and "upper," depending on the particular orientation of the figure.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10%, 5% of the stated value.

Hereinafter, embodiments of the invention will be described in detail with reference to the accompanying drawings.

Hereinafter, as an example of a display device, a liquid crystal display device will be described. However, the display device of the invention is not limited thereto, and can be applied to other displays such as electrophoretic display, organic light-emitting display, inorganic electroluminescent display, field emission display, surface-conduction electron-emission display, plasma display, and cathode ray display.

Figure 2:
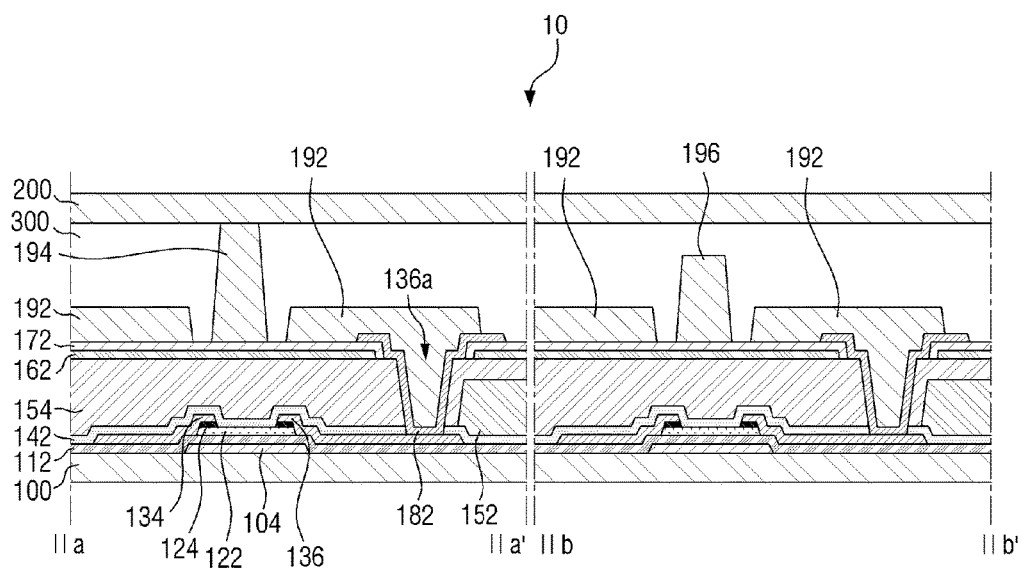
FIG. 2 shows cross-sectional views taken along lines IIa-IIa' and IIb-IIb' of FIG. 1.
Figure 3:
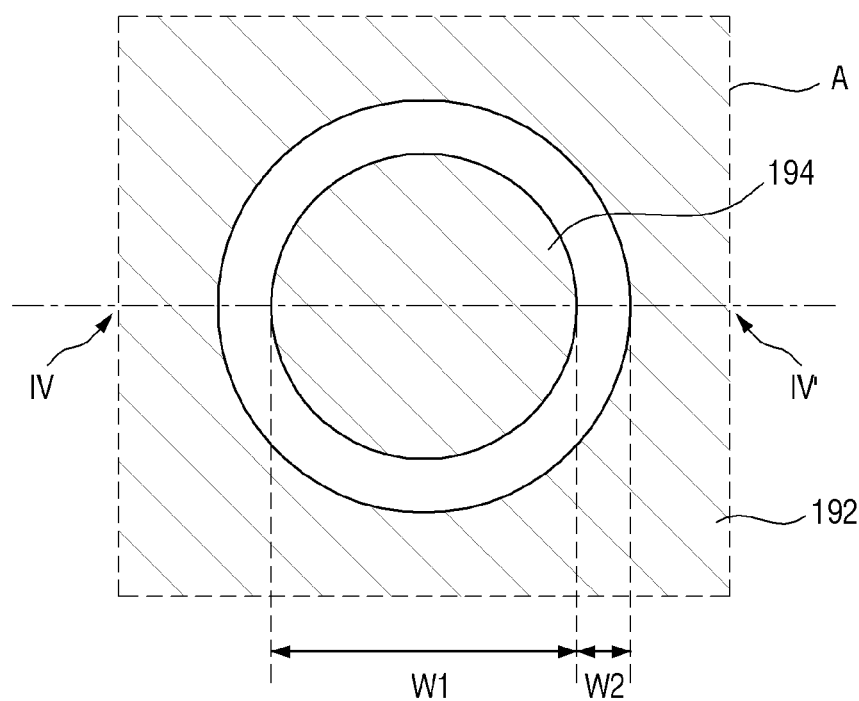
FIG. 3 is an enlarged view of region A of FIG. 1.
Figure 5:
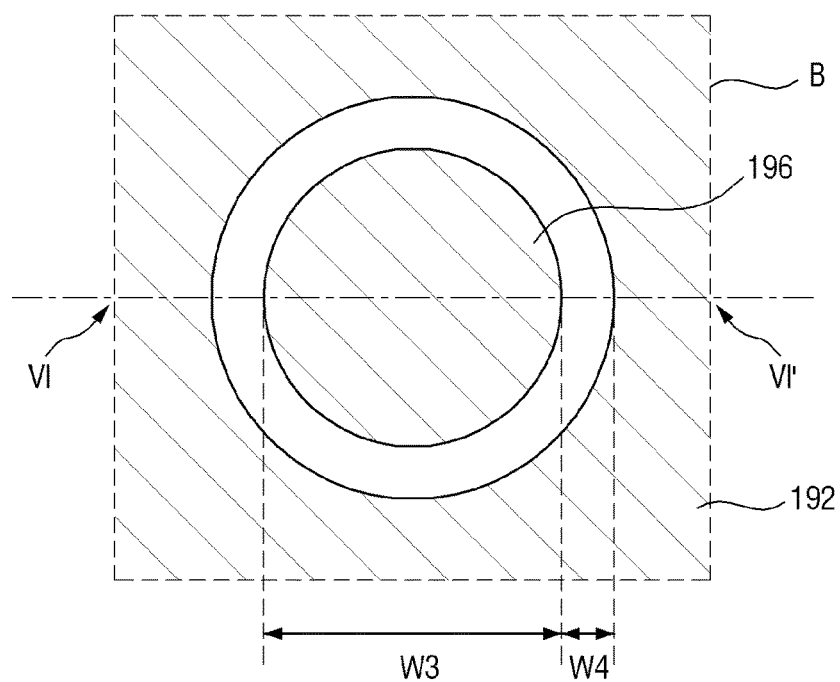
FIG. 5 is an enlarged view of region B of FIG. 1.
Figure 6:
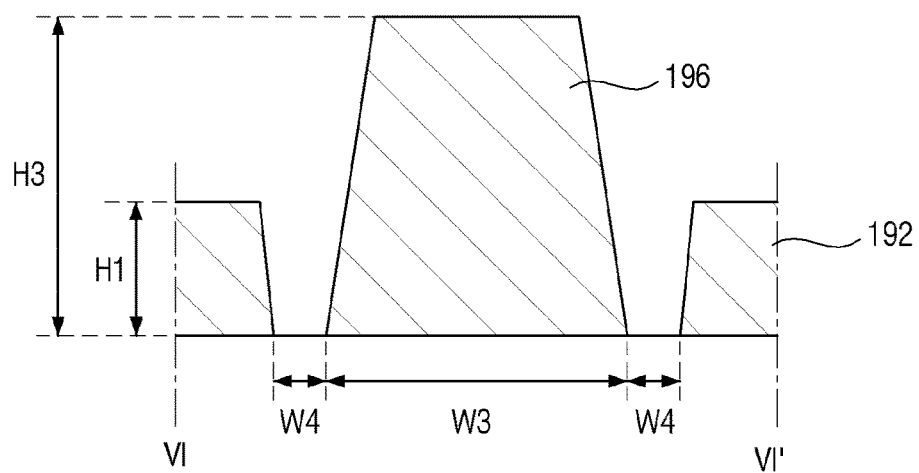
FIG. 6 is a cross-sectional view taken along line VI-VI' of FIG. 5.

FIG. 1 is a plan view of a liquid crystal display device according to an embodiment of the invention. FIG. 2 shows cross-sectional views taken along lines IIa-IIa' and IIb-IIb' of FIG. 1. FIG. 3 is an enlarged view of region A of FIG. 1. Specifically, FIG. 3 is a plan view illustrating the positional relationship between a light blocking pattern and a main column spacer. FIG. 5 is an enlarged view of region B of FIG. 1. Specifically, FIG. 5 is a plan view illustrating the positional relationship between a light blocking pattern and sub column spacer. FIG. 6 is a cross-sectional view taken along line VI-VI' of FIG. 5.

Referring to FIGS. 1 to 6, an embodiment of the liquid crystal display device 10 according the invention includes a first substrate 100, a second substrate 200 facing the first substrate 100, and a liquid crystal layer 300 interposed between the first substrate 100 and the second substrate 200.

The first substrate 100 and the second substrate 200 may include an insulating material, which may be appropriately selected by those skilled in the art, for example, transparent glass, quartz, ceramic, or transparent plastic. The first substrate 100 and the second substrate 200 may be disposed to opposite to, e.g., to face, each other.

A plurality of gate wirings (102, 104) and a plurality of data wirings (132, 134, 136) may be disposed on the first substrate 100.

The gate wiring (102, 104) may include a plurality of gate lines 102 and a plurality of gate electrode 104. The data wiring (132, 134, 136) may include a plurality of data lines 132, a plurality of source electrode 134, and a plurality of drain electrodes 136.

The gate wiring (102, 104) and the data wiring (132, 134, 136) may include or be made of aluminum-based metals such as aluminum (Al) and aluminum alloys, silver-based metals such as silver (Ag) and silver alloys, copper-based metals such as copper (Cu) and copper alloys, molybdenum-based metals such as molybdenum (Mo) and molybdenum alloys, chromium (Cr), titanium (Ti), or tantalum (Ta). In an embodiment, each of the gate wiring (102, 104) and the data wiring (132, 134, 136) may have a multi-layer structure including two conductive films (not shown) whose physical properties are different from each other. In such an embodiment, one conductive film of the two conductive films may include or be made of an aluminum-based metal, a silver-based metal, or a copper-based metal, and the other conductive film of the two conductive films may include or be made of a molybdenum-based metal, chromium (Cr), titanium (Ti), or tantalum (Ta). In one embodiment, for example, the two conductive films may include a combination of a lower chromium film and an upper aluminum film, or a combination of a lower aluminum film and an upper molybdenum film. However, the invention is not limited thereto, and the gate wiring (102, 104) and the data wiring (132, 134, 136) may include or be made of various metals and conductors.

Each of the gate lines 102 may extend along the boundary of pixels in a first direction, for example, in a horizontal direction, and each of the data lines 132 may extend along the boundary of pixels in a second direction, for example, in a vertical direction. In an embodiment, the gate lines 102 and the data lines 132 are arranged to vertically intersect with each other to define a pixel region. In one embodiment, for example, the pixel region is defined as a region surrounded by the gate lines 102 and the data lines 132, but not being limited thereto. In an alternative embodiment, the pixel region may be defined by a black matrix.

In an embodiment, at least one gate electrode 104 is disposed to be connected to each of the gate lines 102 for each pixel. The gate electrode 104 may be branched from the gate line 102 toward a semiconductor layer 122, or may be defined by a protruding portion of the gate line 102. However, the invention is not limited thereto, and the gate electrode 104 may be defined by a portion of the gate line 102 that is on an extending path of the gate line 102 and overlaps the semiconductor layer 122.

In an embodiment, at least one source electrode 134 is disposed to be connected to each of the data lines 132 for each pixel. The source electrode 134 may be branched from the data line 132 toward the semiconductor layer 122, or may be defined by a protruding portion of the data line 132. However, the invention is not limited thereto, and the source electrode 134 may be defined in a region of the data line 132 that is on an extending path of the data line 132 and overlaps the semiconductor layer 122. The drain electrode 136 may be disposed to be spaced apart from the source electrode 134 with respect to the semiconductor layer 122, and may be electrically connected to a pixel electrode 182 through a contact hole 136a defined through a first protective layer 142 and a second protective layer 172.

In an embodiment, a gate insulating film 112 is disposed between the gate wiring (102, 104) and the data wiring (132, 134, 136). In an embodiment of the invention, the gate insulating film 112 may be disposed on the gate wiring (102, 104), and the data wiring (132, 134, 136) may be disposed on the gate insulating film 112. The gate insulating film 112 may include or be made of silicon nitride (SiNx), silicon oxide ($SiO_2$), silicon oxynitride (SiON), or a combination thereof, e.g., a laminated film thereof. The gate insulating film 112 maintains the insulation between the gate wiring (102, 104) and the conductive thin films such as the data lines 132 disposed on the gate wiring (102, 104).

In an embodiment, the semiconductor layer 122 is disposed on the gate insulating film 112, and may include or be made of hydrogenated amorphous silicon or polycrystalline silicon. The semiconductor layer 122 is disposed such that at least a part thereof overlaps the gate electrode 104. The semiconductor layer 122 constitutes a thin film transistor together with the gate electrode 104, the source electrode 134 and the drain electrode.

The semiconductor layer 122 may have various shapes, such as an island shape, a linear shape, and the like. In one embodiment, as shown in FIG. 3, the semiconductor layer 122 may be in an island shape, but the invention is not limited thereto. In an alternative embodiment, where the semiconductor layer 122 is in a linear shape, although not shown, such a linear shaped semiconductor layer 122 may overlap the data wiring (132, 134, 136).

A resistive contact layer 124 including n+-hydrogenated amorphous silicon or the like and doped with n-type impurities at a high concentration may be disposed on the semiconductor layer 122. In an embodiment, the resistive contact layer 124 is disposed between the semiconductor layer 122 disposed therebeneath and the source electrode 134 disposed thereon and is disposed between the semiconductor layer 122 disposed therebeneath and the drain electrode 136 disposed thereon, thus reducing contact resistance between layers disposed thereon and therebeneath. The resistive contact layer 124, similarly to the semiconductor layer 122, may have various shapes, such as an island shape, a linear shape, and the like. In an embodiment, where the semiconductor layer 122 has an island shape, the resistive contact layer 124 may have an island shape. In an embodiment, where the semiconductor layer 122 has a linear shape, the resistive contact layer 124 may also have a linear shape. Unlike the semiconductor layer 122, the resistive contact layer 124 has a separated space, through which the source electrode 134 and the drain electrode 136 face each other and are spaced apart from each other, to expose the semiconductor layer 122 therebeneath. A portion of the semiconductor layer 122, which is corresponding to the space, may define a channel.

When a channel is formed in the semiconductor layer 122 by allowing the gate electrode 104 to receive a gate-on signal, a thin film transistor is turned on, and the drain electrode 136 receives a data signal from the source electrode 134 and transmits this data signal to a pixel electrode 182.

A first protective layer (passivation layer) 142 is disposed on the data wiring (132, 134, 136) and the exposed portion of the semiconductor layer 122. The first protective layer 142 may include an inorganic material, such as silicon nitride or silicon oxide, and a material, such as a-Si:C:O or a-Si:O:F, which is formed by plasma enhanced chemical vapor deposition ("PECVD").

An organic layer 154 may be disposed on the first protective layer 142. The organic layer 154 provides a planarized surface, and may include a photosensitive material.

A contact hole 136a that exposes at least a part of the drain electrode 136 may be defined through the first protective layer 142 and the organic layer 154. At least a part of the drain electrode 136 exposed through the contact hole 136a may in contact with the pixel electrode 182. Through the contact hole 136a, the drain electrode 136 may be electrically connected to the pixel electrode 182.

In some embodiments, as shown in FIG. 2, a color filter 152 may be disposed between the organic layer 154 and the first protective layer 142. The color filter 152 may include a red (R) color filter, a green (G) color filter, and a blue (B) color filter. Each of R, G and B color filters is disposed in one pixel to define R, G, and B pixels. The color filter 152 may be disposed to overlap the pixel electrode 182. The color filter 152 may include a photosensitive organic material including a pigment. In an embodiment, the color filter 152 may be covered by the organic layer 154, and the organic layer 154 on the color filter 152 planarizes the level differences of the R, G and B color filters, but the invention is not limited thereto.

A common electrode 162 may be disposed on the organic layer 154. The common electrode 162 receives a common voltage, and generates an electric field together with the pixel electrode 182, to control the alignment direction of liquid crystal molecules in the liquid crystal layer 300. In an embodiment, an opening that exposes the region in which the contact hole 136a is defined in the common electrode 162. In an embodiment, at least a part of the drain electrode 136 may be exposed through the opening in the common electrode 162. The common electrode 162, except for the opening, may be integrally formed as a single unitary and indivisible unit over the entire pixel region surrounded by the gate lines 102 and the data lines 132. The common electrode 162 may include or be made of a transparent conductive material such as indium tin oxide ("ITO") or indium zinc oxide ("IZO"), but the invention is not limited thereto.

A second protective layer 172 may be disposed on the common electrode 162 and the organic layer 154. In an embodiment, an opening that exposes the region in which the contact hole 136a is defined in the second protective layer 172. In such an embodiment, at least a part of the drain electrode 136 may be exposed through the opening in the second protective layer 172. The second protective layer 172 may include or be made of an inorganic insulating material. In one embodiment, for example, the second protective layer 172 may include silicon nitride, silicon oxide, or the like. The second protective layer 172 is disposed between the pixel electrode 182 and the common electrode 162 to insulate the pixel electrode 182 and the common electrode 162 from each other.

The pixel electrode 182 may be disposed on the second protective layer 172 for each pixel. A part of the pixel electrode 182 is disposed in the contact hole 136a to in contact with the drain electrode 136.

The pixel electrode 182 generates an electric field together with the common electrode 162 to rotate the liquid crystal molecules in the liquid crystal layer 300. The pixel electrode 182 may include a transparent conductive material such as ITO or IZO, but the invention is not limited thereto.

The pixel electrode 182 may have a plurality of incision patterns having various shapes, such as a quadrangle, closed curve, or a fish bone, for example. In one embodiment, as shown in FIG. 1, the incision pattern 182a may be a stripe pattern. However, the invention is not limited thereto, and the shape of the incision pattern 182a may be variously modified. When the semiconductor layer 122 is in a linear shape, although not shown, such a linear shaped semiconductor layer 122 may overlap the data wirings 132, 134 and 136. A light blocking pattern 192 may be disposed on the second protective layer 172 and the pixel electrode 182. The light blocking pattern 192 effectively prevents light leakage. The light blocking pattern may cover a thin film transistor region and a non-pixel region (region between pixels, a gate line region and a data line region). In one embodiment, for example, the light blocking pattern 192, as shown in FIG. 2, may be disposed in the contact hole 136a, but the invention is not limited thereto. The light blocking pattern 192 may include or be made of a black organic polymer material including a black dye or pigment or a metal (metal oxide) such as chromium (chromium oxide), for example.

A column spacer array (194, 196) maintains the distance between the first substrate 100 and the second substrate 200. In an embodiment, the column spacer array (194, 196) includes a main column spacer 194 and a sub column spacer 196.

In the liquid crystal layer 300, an end of the main column spacer 194 adjacent to the second substrate may be closer to the second substrate 200 than an end of the sub column spacer 196 adjacent to the second substrate 200 is to the second substrate 200. In one embodiment, for example, as shown in FIG. 2, the end of the main column spacer 194 may be in contact with a surface (e.g., an inner surface) of the second substrate 200, and the sub column spacer 196 may be spaced apart from the surface of the second substrate 200 by a predetermined distance. In such an embodiment, the distance between the first substrate 100 and the second substrate 200 may be primarily maintained by the main column spacer 194, and, when higher pressure is applied, the distance between the first substrate 100 and the second substrate 200 may be secondarily maintained by the sub column spacer 196.

In one embodiment, as shown in FIG. 2, the end of the main column spacer 194 adjacent to the second substrate 200 is in contact with the side of the second substrate 200, but the invention is not limited thereto. In an alternative embodiment, the end of the main column spacer 194 adjacent to the second substrate may be spaced apart from the surface of the second substrate 200, and the end of the main column spacer 194 adjacent to the second substrate 200 is closer to the second substrate 200 than the end of the sub column spacer 196 adjacent to the second substrate 200 is to the second substrate 200.

The column spacer array (194, 196), as shown in FIGS. 1 and 2, may be disposed in a region corresponding to a thin film transistor. At least a part of the column spacer array (194, 196) may overlap the gate wiring (102, 104). However, the arrangement of the column spacer array (194, 196) is not limited to the arrangement shown in FIGS. 1 and 2, but may be variously modified.

Alignment films (not shown) may be respectively disposed on a surface (e.g., an inner surface) of the first substrate 100 and a surface (e.g., an inner surface) of the second substrate 200, which face the liquid crystal layer 300. In an embodiment, alignment films (not shown) capable of aligning the liquid crystal layer 300 may be disposed on the pixel electrode 182, the second protective film 172, the light blocking pattern 192 and the column spacer array (194, 196).

The liquid crystal layer 300 including liquid crystal molecules having positive dielectric anisotropy or negative dielectric anisotropy may be interposed between the first substrate 100 and the second substrate 200.

In some embodiments, the column spacer array (194, 196) may include or be made of the same material as the light blocking material 192. In an embodiment, the column spacer array (194, 196) and the light blocking pattern 192 may be provided or formed at the same time through a same patterning process using halftone mask exposure or slit mask exposure. In such an embodiment, the column spacer array (194, 196) and the light blocking pattern 192 may be provided or formed at the same time with the same material.

In an embodiment, when the column spacer array (194, 196) and the light blocking pattern 192 may be integrally formed as a single unitary and indivisible unit at the same time using a halftone mask, the critical dimension ("CD") bias may increase due to the exposure intensity of a halftone portion, compared to when only the column spacer array (194, 196) is formed. That is, the difference between the designed size of the mask and the actual size of the column spacer array (194, 196) may increase. Similarly, when the CD bias of the column spacers 194 and 196 increases, the size of the BCS pattern increases, such that a high resolution may not be effectively realized.

Thus, in an embodiment of the invention, the column spacer array (194, 196), as shown in FIGS. 1 and 2, is separated and spaced apart from the light blocking pattern 192. In such an embodiment, the column spacer array (194, 196) may be in the shape of an island surrounded by the light blocking pattern 192 when viewed in plan or viewed from a plan view. In such an embodiment, the shape of the column spacer array (194, 196) may be similar to that of the column space array in case where only the column spacer array (194, 196) is formed. When only the column spacer array (194, 196) is formed alone, the peripheral portion of the column spacer array (194, 196) may be a light blocking portion (in the case of negative photosensitivity) or a light transmitting portion (in the case of positive photosensitivity), not a halftone portion. Therefore, when only the column spacer array (194, 196) is formed, the light emitted from the adjacent halftone portion may be effectively prevented from being scattered or refracted, compared to a case where the column spacer array (194, 196) and the light blocking pattern 192 are integrally formed as a single unitary and indivisible unit, thereby reducing the CD bias of the column spacer array (194, 196). Accordingly, in such an embodiment, since the size of the column spacer array (194, 196) may be adjusted to a size corresponding to the designed value of a mask, a high resolution may be effectively realized.

In an embodiment, the space between the column spacer array (194, 196) and the light blocking pattern 192 may overlap the wiring disposed thereunder. In one embodiment, for example, the gate electrode 104 or the gate line 102 may be disposed under the space defined between the column spacer array (194, 196) and the light blocking pattern 192. In such an embodiment, the column spacer array (194, 196) and the light blocking pattern 192 are not disposed on the wiring, and the space, in which light leakage may occur, may be shielded by the wiring. Therefore, the light leakage phenomenon in the space between the column spacer array (194, 196) and the light blocking pattern 192 may be effectively prevented.

Figure 4:
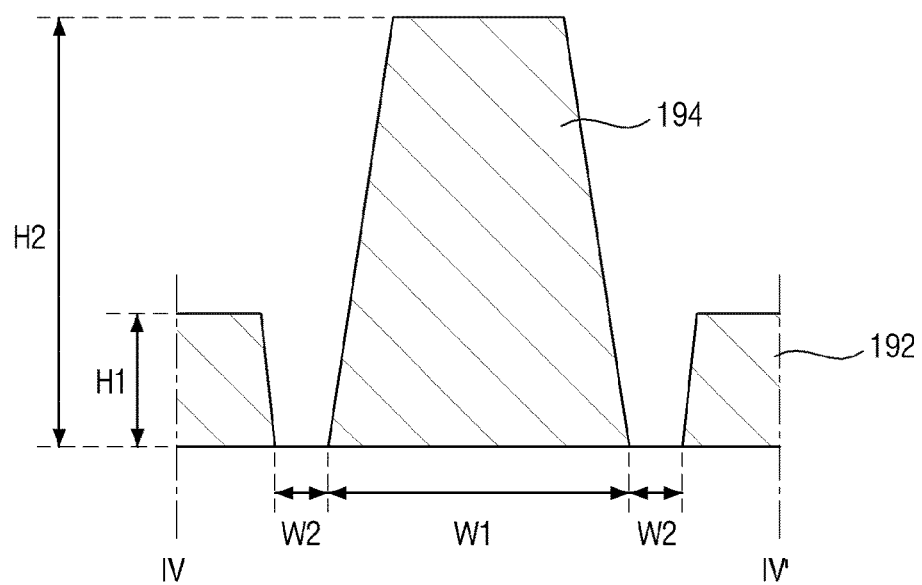
FIG. 4 is a cross-sectional view taken along line IV-IV' of FIG. 3.

In some embodiments, each of the main column spacer 194 and the sub column spacer 196, as shown in FIGS. 1, 3 and 4, may be in a circular shape when viewed in plan. In one embodiment, for example, when the space between the main column spacer 194 and the light blocking pattern 192 or the space between the sub column spacer 196 and the light blocking pattern 192 is viewed in plan, an outer boundary and an inner boundary of the space may have a circular shape, that is, a ring shape or a donut shape, as shown in FIGS. 3 and 5.

Referring to FIGS. 3 and 4, in an embodiment of the display device, the width (W1), e.g., a diameter, of the main column spacer 194 may be in a range of about 5 micrometers ($\mu m$) to about 40 $\mu m$, and the height (H2) of the main column spacer 194 may be in a range of about 2.5 μm to about 4.0 μm. In such an embodiment, the height (H1) of the light blocking pattern 192 may be in a range of about 1.0 μm to about 1.5 μm. In such an embodiment, the height (H2) of the main column spacer 194 may be higher than the height (H1) of the light blocking pattern 192. In such an embodiment, the distance (W2) between the main column spacer 194 and the light blocking pattern 192 may be in a range of about 2 μm to about 10 μm. However, these numerical value ranges are merely exemplary, and the invention is not limited thereto.

Referring to FIGS. 5 and 6, in an embodiment of the display device, the width (W3) of the sub column spacer 196 may be in a range of about 5 μm to about 40 μm, and the height (H3) of the sub column spacer 196 may be in a range of about 2.0 μm to about 3.0 μm. In such an embodiment, the height (H1) of the light blocking pattern 192 may be in a range of about 1.0 μm to about 1.5 μm. In such an embodiment, the height (H3) of the sub column spacer 196 may be higher than the height (H1) of the light blocking pattern 192. In such an embodiment, the distance (W4) between the sub column spacer 196 and the light blocking pattern 192 may be in a range of about 2 μm to about 10 μm. However, these numerical value ranges are exemplary, and the invention is not limited thereto.

The distance between the column spacer array (194, 196) and the light blocking pattern 192, which are spaced apart from each other, may means the distance between the column spacer array (194, 196) and the light blocking pattern 192 corresponding to each other. When the distances between the column spacer array (194, 196) and the light blocking patterns 192 corresponding to each other are not uniform, the distance therebetween may refer to the minimum distance therebetween.

As shown in FIGS. 3 and 5, in some embodiments, the shape of the column spacer array (194, 196) may be a circular shape when viewed in plan, and the shape of the space between the main column spacer 194 or the sub column spacer 195 and the light blocking pattern 192 may be a ring shape or a donut shape when viewed in plan. However, these shapes are merely exemplary, and the invention is not limited thereto. In one alternative embodiment, for example, the shape of the column spacer array (194, 196) may be an elliptic shape or a polygonal shape when viewed in plan. In such an embodiment, when the space between the column spacer array (194, 196) and the light blocking pattern 192 is viewed in plan, the outer boundary of the space may have a circular shape, an elliptic shape, or a polygonal shape. In such an embodiment, when the space between the column spacer array (194, 196) and the light blocking pattern 192 is viewed in plan, the inner boundary of the space may have a circular shape, an elliptic shape, or a polygonal shape.

Figure 7:
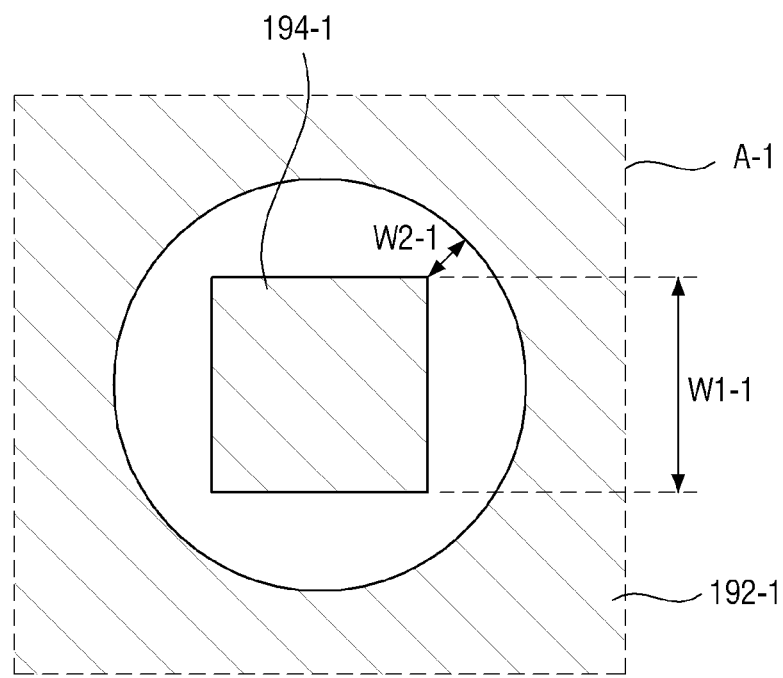
FIG. 7 is an enlarged view of a region corresponding to the region A of FIG. 1 of a liquid crystal display device, according to an alternative embodiment of the invention.
Figure 8:
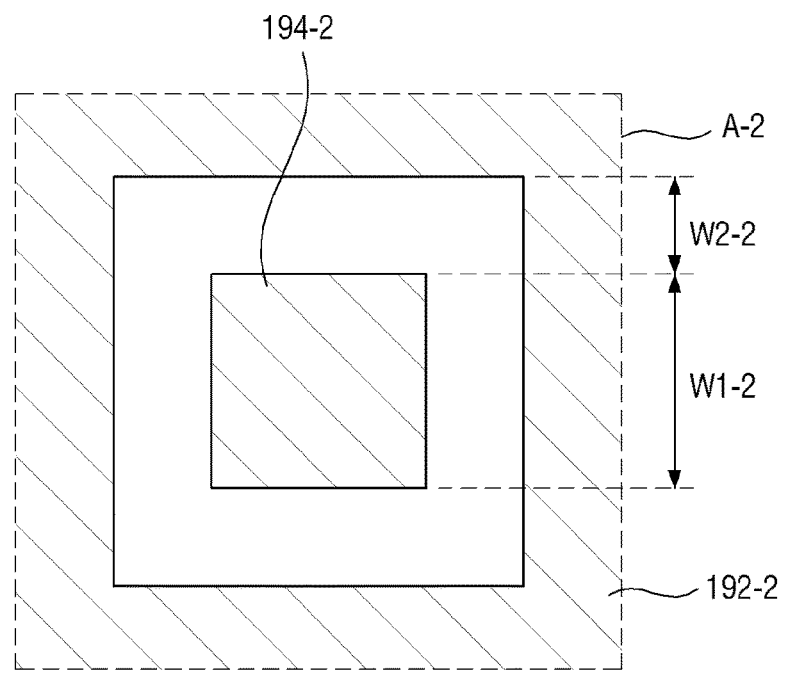
FIGS. 8 and 9 are enlarged views of region each corresponding to the region A of FIG. 1 of a liquid crystal display device, according to another alternative embodiment of the invention.
Figure 9:
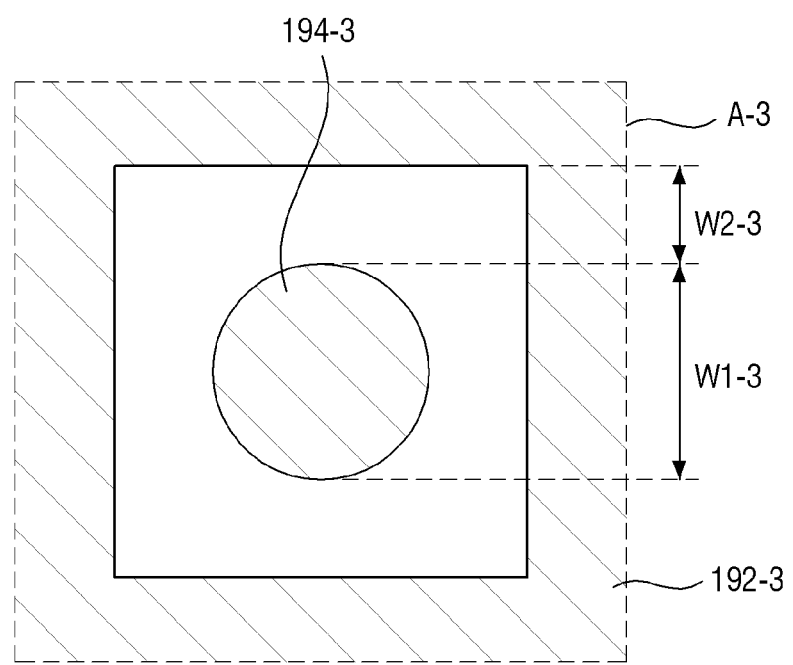

FIG. 7 is an enlarged view of region A-1, corresponding to the region A of FIG. 1, of a liquid crystal display device according to an alternative embodiment of the invention. FIGS. 8 and 9 are enlarged views of regions (region A-2 of FIG. 8 and region A-3 of FIG. 9), each corresponding to the region A of FIG. 1, of a liquid crystal display device according to another alternative embodiments of the invention.

Referring to FIG. 7, an alternative embodiment of the liquid crystal display device 10-1 according to the invention is substantially the same as or similar to an embodiment of the liquid crystal display device 10 described above with reference to FIGS. 1 to 6, except that the configuration of the column spacer in the liquid crystal display device 10-1 is different from that of the column spacer in the liquid crystal display device 10. Hereinafter, an embodiment of the liquid crystal display device 10-1 will be described based on such differences.

In an embodiment, as shown in FIG. 7, the main column spacer 194-1 may be in a square shape when viewed in plan. In such an embodiment, the width (W1-1) of the main column spacer 194-1 may be in a range of about 5 μm to about 40 μm. Referring to FIG. 7, when the space between the main column spacer 194-1 and the light blocking pattern 192-1 is viewed in plan, the outer boundary of the space may have a circular shape, and the inner boundary of the space may have a rectangular shape. The distance (W2-1) between the main column spacer 194-1 and the light blocking pattern 192-1 may be in a range of about 2 μm to 10 μm.

Although the sub column spacer of such an embodiment of the liquid crystal display device 10-1 is not shown, the height of the sub column spacer may be different from that of the above-described main column spacer 194-1, and the shape of the sub column spacer may be the same as that of the above-described main column spacer 194-1. In such an embodiment, the height of the sub column spacer may be lower than that of the main column spacer 194-1, and the shape of the sub column spacer may be a square shape when viewed in plan. In such an embodiment, when the space between the sub column spacer and the light blocking pattern 192-1 is viewed in plan, the outer boundary of the space may have a circular shape, and the inner boundary of the space may have a rectangular shape. The distance (W2-1) between the sub column spacer and the light blocking pattern 192-1 may be in a range of about 2 μm to 10 μm.

Referring to FIG. 8, another alternative embodiment of the liquid crystal display device 10-2 according to the invention is substantially the same as or similar to an embodiment of the liquid crystal display device 10 described with reference to FIGS. 1 to 6, except that the configurations of the main column spacer and light blocking pattern in the liquid crystal display device 10-2 is different from those of the column spacer and light blocking pattern in the liquid crystal display device 10. Hereinafter, the liquid crystal display device 10-2 will be described based on such differences.

In an embodiment, as show in FIG. 8, the main column spacer 194-2 may be in a square shape when viewed in plan. In such an embodiment, the width (W1-2) of the main column spacer 194-2 may be in a range of about 5 μm to 40 μm. Referring to FIG. 8, when the space between the main column spacer 194-2 and the light blocking pattern 192-2 is viewed in plan, the outer boundary of the space may have a rectangular shape, and the inner boundary of the space may also have a rectangular shape. The distance (W2-2) between the main column spacer 194-2 and the light blocking pattern 192-2 may be in a range of about 2 μm to 10 μm.

Although the sub column spacer of such an embodiment of the liquid crystal display device 10-2 is not shown, the height of the sub column spacer may be different from that of the above-described main column spacer 194-2, and the shape of the sub column spacer may be the same as that of the above-described main column spacer 194-2. In such an embodiment, the height of the sub column spacer may be lower than that of the main column spacer 194-2, and the shape of the sub column spacer may be a square shape when viewed in plan. In such an embodiment, when the space between the sub column spacer and the light blocking pattern 192-2 is viewed in plan, the outer boundary of the space may have a rectangular shape, and the inner boundary of the space may have a rectangular shape. The distance between the sub column spacer and the light blocking pattern 192-2 may be in a range of about 2 µm to 10 µm.

Referring to FIG. 9, another alternative embodiment of the liquid crystal display device 10-3 according to the invention is substantially the same as or similar to the liquid crystal display device 10 described with reference to FIGS. 1 to 6, except that the configuration of the light blocking pattern in the liquid crystal display device 10-3 is different from that of the light blocking pattern in the liquid crystal display device 10. Hereinafter, the liquid crystal display device 10-3 will be described based on such differences.

In an embodiment, as shown in FIG. 9, the main column spacer 194-3 may be in a circular shape when viewed in plan. In such an embodiment, the width (W1-3) of the main column spacer 194-3 may be in a range of about 5 µm to 40 µm. Referring to FIG. 9, when the space between the main column spacer 194-3 and the light blocking pattern 192-3 is viewed in plan, the outer boundary of the space may have a rectangular shape, and the inner boundary of the space may have a circular shape. The distance (W2-3) between the main column spacer 194-3 and the light blocking pattern 192-3 may be in a range of about 2 µm to 10 µm.

Although the sub column spacer of such an embodiment of the liquid crystal display device 10-3 is not shown, the height of the sub column spacer may be different from that of the above-described main column spacer 194-3, and the shape of the sub column spacer may be the same as that of the above-described main column spacer 194-3. In such an embodiment, the height of the sub column spacer may be lower than that of the main column spacer 194-3, and the shape of the sub column spacer may be a circular shape when viewed in plan. In such an embodiment, when the space between the sub column spacer and the light blocking pattern 192-3 is viewed in plan, the outer boundary of the space may have a rectangular shape, and the inner boundary of the space may have a circular shape. The distance between the sub column spacer and the light blocking pattern 192-3 may be in a range of about 2 µm to 10 µm.

In some embodiments, the column spacer may be separated and spaced apart from the light blocking pattern, but the invention is not limited thereto. In one embodiment, for example, the column spacer may be configured such that the column spacer and the light blocking pattern are integrally formed as a single unitary and indivisible unit, and may be connected to each other through a connecting member having lower height than the light blocking pattern.

Figure 10:
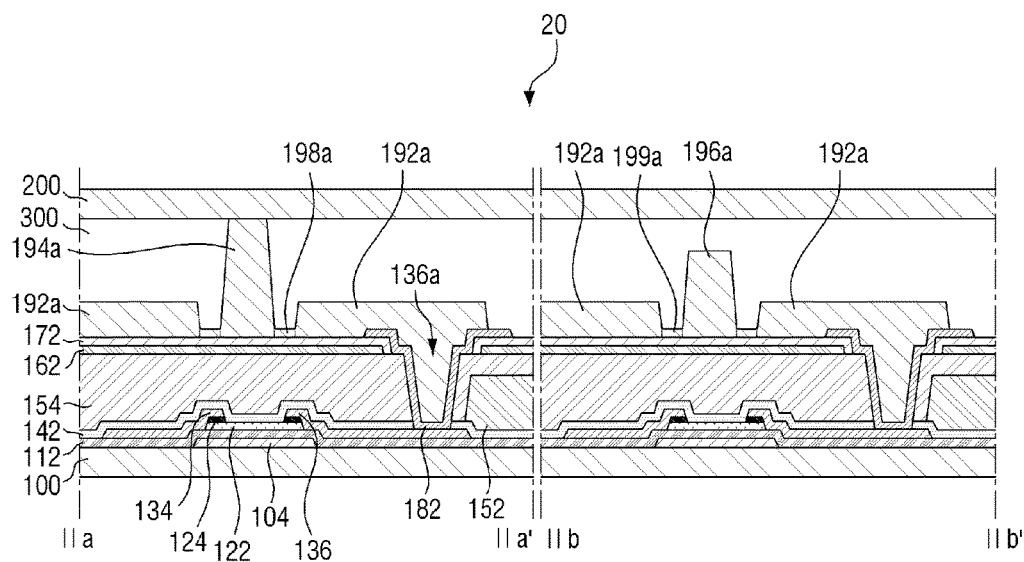
FIG. 10 shows cross-sectional views taken along lines corresponding to the lines IIa-IIa' and IIb-IIb' of FIG. 1 of a liquid crystal display device, according to still another alternative embodiment of the invention.
Figure 11:
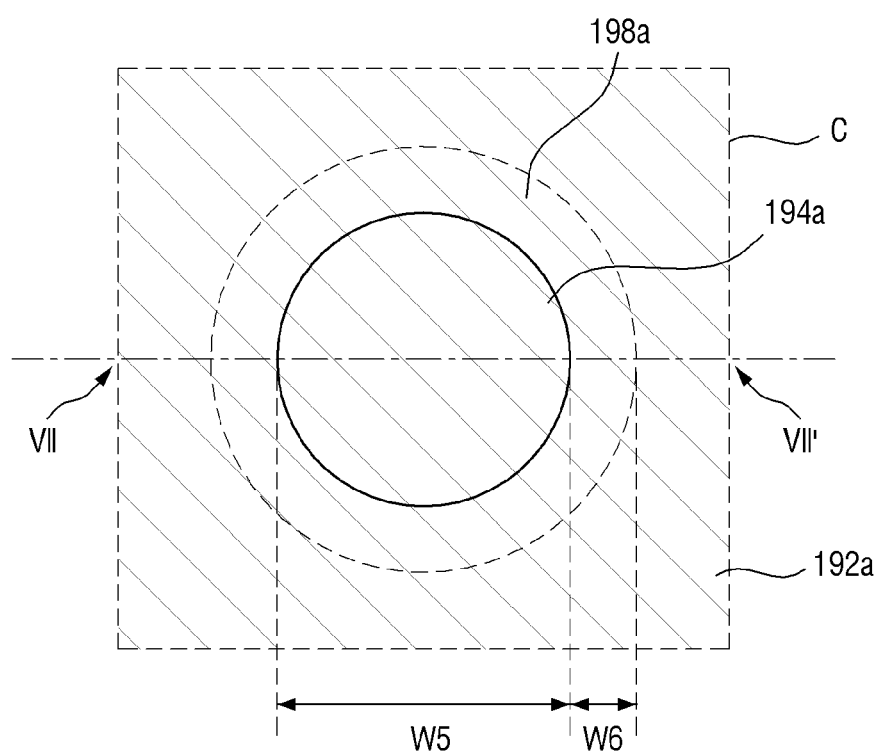
FIG. 11 is an enlarged view of a region corresponding to the region A of FIG. 1 of a liquid crystal display device, according to still another alternative embodiment of the invention.
Figure 12:
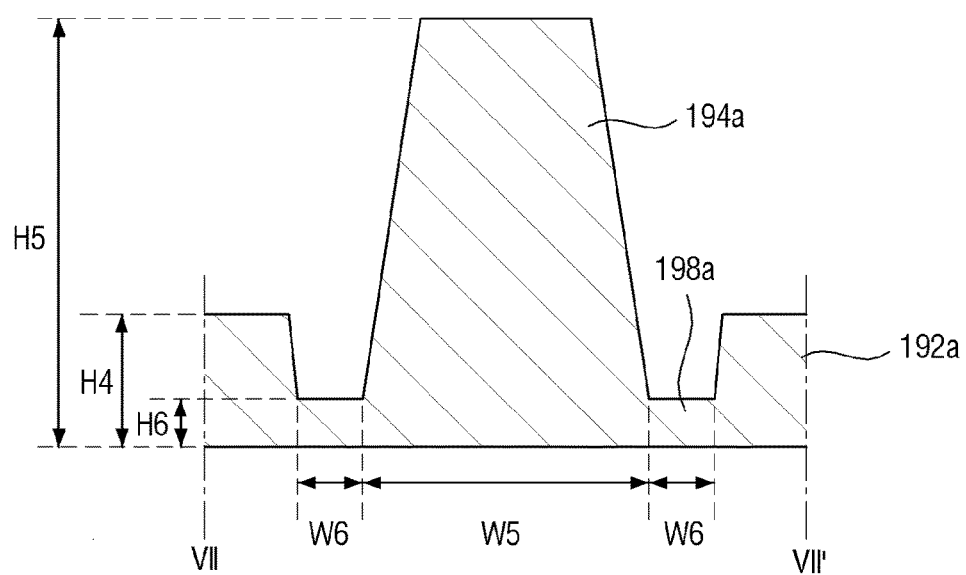
FIG. 12 is a cross-sectional view taken along line VII-VII' of FIG. 11.
Figure 13:
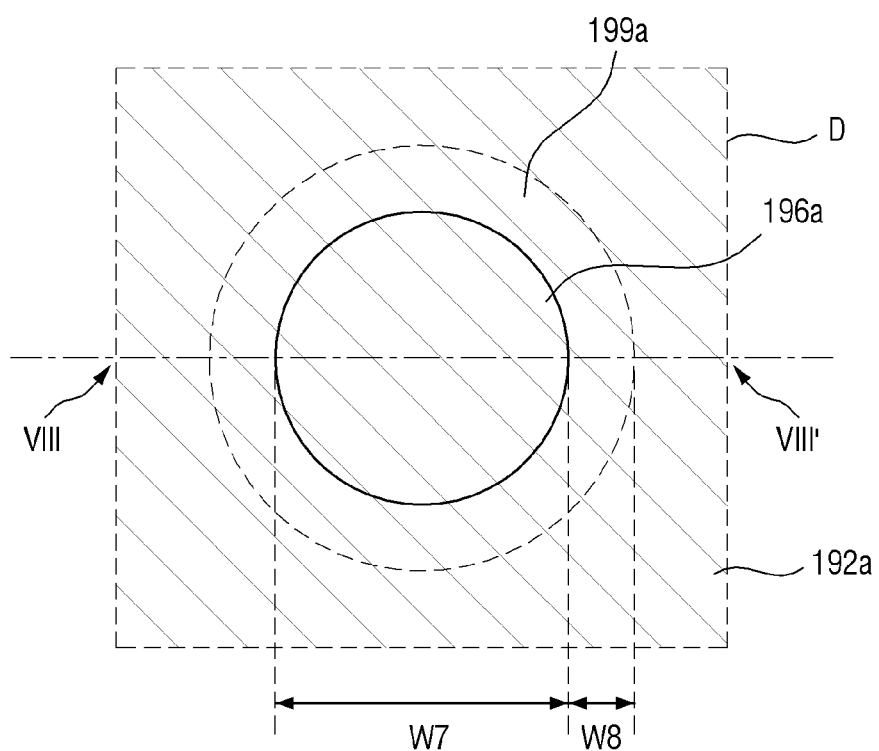
FIG. 13 is an enlarged view of a region corresponding to the region B of FIG. 1 of a liquid crystal display device, according to still another alternative embodiment of the invention.
Figure 14:
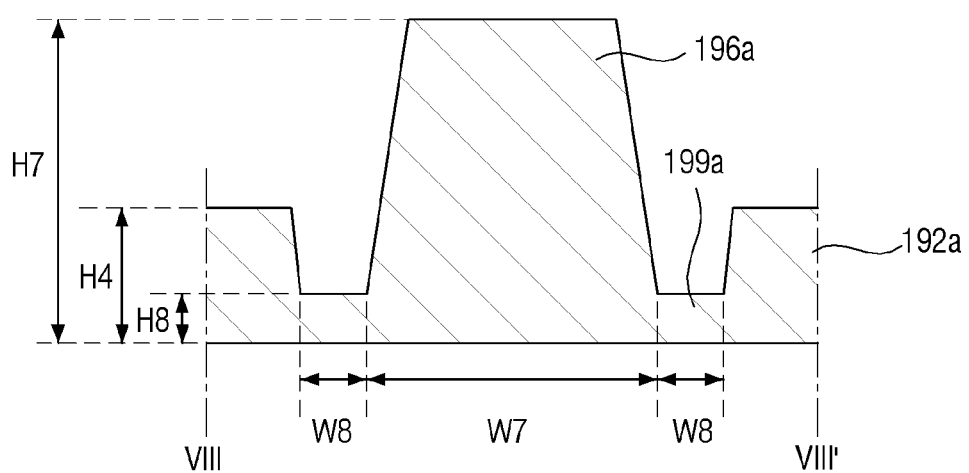
FIG. 14 is a cross-sectional view taken along line VIII-VIII' of FIG. 13.

FIG. 10 shows cross-sectional views taken along lines corresponding to the lines IIa-IIa' and IIb-IIb' of FIG. 1 of a liquid crystal display device according to still another embodiment of the invention. FIG. 11 is an enlarged view of a region corresponding to the region A of FIG. 1 of a liquid crystal display device according to still another embodiment of the invention. Specifically, FIG. 11 is a plan view illustrating the positional relationship between a light blocking pattern, a main column spacer, and a connecting member. FIG. 12 is a cross-sectional view taken along line VII-VII' of FIG. 11. FIG. 13 is an enlarged view of a region corresponding to the region B of FIG. 1 of a liquid crystal display device according to still another embodiment of the invention. Specifically, FIG. 13 is a plan view illustrating the positional relationship between a light blocking pattern, a sub column spacer, and a connecting member. FIG. 14 is a cross-sectional view taken along line VIII-VIII' of FIG. 13.

An embodiment of a liquid crystal display device 20 shown in FIGS. 10 to 14 is substantially the same as or similar to an embodiment of the liquid crystal display device 10 described with reference to FIGS. 1 to 6, except that connecting member 198a and 198b are further provided. Hereinafter, the liquid crystal display device 20 will be described based on such differences.

In an embodiment, as shown in FIGS. 10 to 14, the liquid crystal display device 20 further includes a first connecting member 198a and a second connecting member 199a. The first connecting member 198a is connected to the main column spacer 194a and the light blocking pattern 192a, and the second connecting member 199a is connected to the sub column spacer 196a and the light blocking pattern 192a.

The first connecting member 198a may be disposed between the main column spacer 194a and the light blocking pattern 192a. In such an embodiment, the first connecting member 198a may be disposed in the space between the main column spacer 194a and the light blocking pattern 192a when viewed in plan.

In some embodiments, as shown in FIGS. 10 to 12, the first connecting member 198a may be disposed over the entire space between the main column spacer 194a and the light blocking pattern 192a when viewed in plan. However, the invention is not limited thereto, and alternatively, the first connecting member 198a may be disposed in only a part of the space between the main column spacer 194a and the light blocking pattern 192a when viewed in plan.

As shown in FIG. 11, when the first connecting member 198a is viewed in plan, the outer boundary and inner boundary thereof may have a circular shape. That is, the first connecting member 198a may have a ring shape or a donut shape, when viewed in plan. However, this shape is exemplary, and the invention is not limited thereto.

Referring to FIGS. 11 and 12, in an embodiment, the width (W5) of the main column spacer 194a may be in a range of about 5 µm to 40 µm, and the height (H5) of the main column spacer 194a may be in a range of about 2.5 µm to 4.0 µm. In such an embodiment, the height (H4) of the light blocking pattern 192a may be in a range of about 1.0 µm to 1.5 µm. In such an embodiment, the height (H5) of the main column spacer 194a may be higher than the height (H4) of the light blocking pattern 192a. In such an embodiment, the width (W6) of the first connecting member 198a may be in a range of about 2 µm to 10 µm. In such an embodiment, the height (H6) of the first connecting member 198a may be lower than the height (H4) of the light blocking pattern 192a. However, these numerical value ranges are exemplary, and the invention is not limited thereto.

The second connecting member 199a may be disposed between the sub column spacer 196a and the light blocking pattern 192a. In such an embodiment, the second connecting member 199a may be disposed in the space between the sub column spacer 196a and the light blocking pattern 192a when viewed in plan.

In some embodiments, as shown in FIGS. 10, 13 and 14, the second connecting member 199a may be disposed over the entire space between the sub column spacer 196a and the light blocking pattern 192a when viewed in plan. However, the invention is not limited thereto, and alternatively, the second connecting member 199a may be disposed in only a part of the space between the sub column spacer 196a and the light blocking pattern 192a when viewed in plan.

As shown in FIG. 13, when the second connecting member 199a is viewed in plan, the outer boundary and inner boundary thereof may have a circular shape. In such an embodiment, the second connecting member 199a may have a ring shape or a donut shape, when viewed in plan. However, this shape is exemplary, and the invention is not limited thereto.

Referring to FIGS. 13 and 14, in an embodiment, the width (W7) of the sub column spacer 164a may be in a range of about 5 μm to 40 μm, and the height (H7) of the sub column spacer 1964a may be in a range of about 2.0 μm to 3.0 μm. In such an embodiment, the height (H4) of the light blocking pattern 192a may be in a range of about 1.0 μm to 1.5 μm. In such an embodiment, the height (H7) of the sub column spacer 196a may be higher than the height (H4) of the light blocking pattern 192a. In such an embodiment, the width (W8) of the second connecting member 199a may be in a range of about 2 μm to 10 μm. In such an embodiment, the height (H8) of the second connecting member 199a may be lower than the height (H4) of the light blocking pattern 192a. However, these numerical value ranges are exemplary, and the invention is not limited thereto.

Next, a method of manufacturing the above-described liquid crystal display device 10, according to an embodiment of the invention.

FIGS. 15 to 29 are cross-sectional views showing the method of manufacturing a liquid crystal display device, according to an embodiment of the invention.

Figure 15:
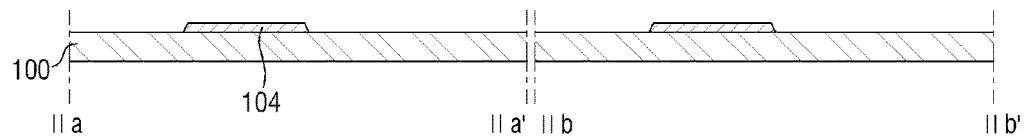
FIGS. 15 to 29 are cross-sectional views showing a method of manufacturing a liquid crystal display device, according to an embodiment of the invention.

First, referring to FIGS. 1, 2 and 15, a gate wiring (102, 104) is provided or formed on a first substrate 100.

A first metal layer (not shown) is formed on the first substrate 100 including a transparent material such as glass and quartz. The first metal layer (not shown) may include or be made of aluminum, copper, silver, molybdenum, chromium, titanium, tantalum or an alloy thereof, and may have a multiplayer structure including two or more layers having different physical properties from each other. In an embodiment, the metal layer (not shown), for example, may be deposited by sputtering. Subsequently, the metal layer (not shown) is patterned by photolithography using a first exposure mask to form the gate wiring (102, 104) including a gate line 102 and a gate electrode 104. The gate electrode 104 may be fabricated in the form of a protrusion branched from the gate line 102.

Figure 16:
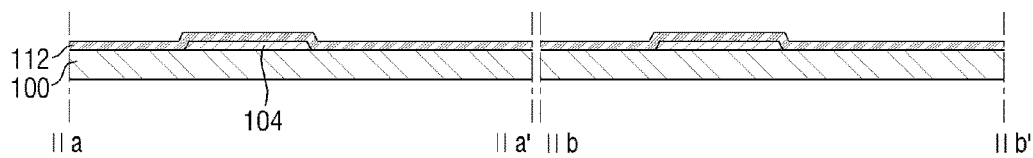

Next, referring to FIG. 16, a gate insulating film 112 is provided or formed on the gate wiring (102, 104). The gate insulating film 112 may be formed by PECVD, and may include silicon oxide (SiNx) or silicon oxide (SiO₂).

Figure 17:
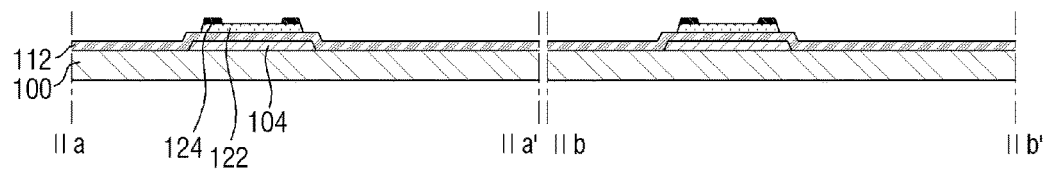

Next, referring to FIG. 17, a semiconductor layer 122 and a resistive contact layer 124 are provided or formed on the gate insulating film 112. The semiconductor layer 122 may be formed using hydrogenated amorphous silicon or polycrystalline silicon. The semiconductor layer 122 and the resistive contact layer 124 may be formed by photolithography.

Figure 18:
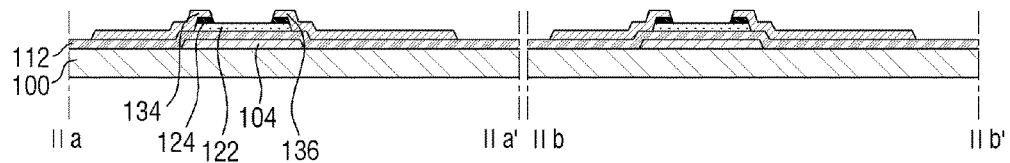

Next, referring to FIG. 18, a data wiring (132, 134, 136) including a data line 132 intersecting with the gate line 102 to define a unit pixel, a source electrode 134, and a drain electrode is provided or formed on the gate insulating film 112, the semiconductor layer 122 and the resistive contact layer 124 by photolithography. The data wiring (132, 134, 136), similarly to the gate wiring (102, 104), may include or be made of aluminum, copper, silver, molybdenum, chromium, titanium, tantalum or an alloy thereof, and may have a multiplayer structure including two or more layers having different physical properties from each other.

In an embodiment, the semiconductor layer 122, the resistive contact layer 124, and the data wiring (132, 134, 136) may be respectively formed by a separate photolithography process. However, the invention is not limited thereto, and alternatively, the semiconductor layer 122, the resistive contact layer 124 and the data wiring (132, 134, 136) may be formed by a photolithography process using a single mask. In such an embodiment, remnants of the semiconductor layer 122 and the resistive contact layer 124 may remain under the data line 132. In such an embodiment, the semiconductor layer 122 and the resistive contact layer 124 may be formed in a linear fashion. The semiconductor layer 122 constitutes a thin film transistor together with the gate electrode 104, the source electrode 134 and the drain electrode 136, and may form a channel.

Figure 19:
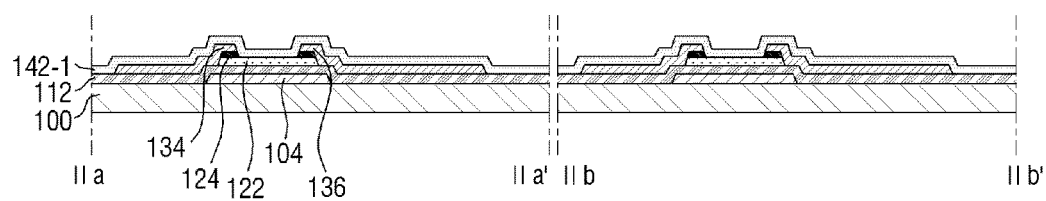

Next, referring to FIG. 19, a first protective film 142-1 is provided or formed on the first substrate 100 provided with the thin film transistor. The first protective layer 142-1 may include or be made of an inorganic material, such as silicon nitride or silicon oxide, for example, and may be formed by PECVD using a material, such as a-Si:C:O or a-Si:O:F.

Figure 20:
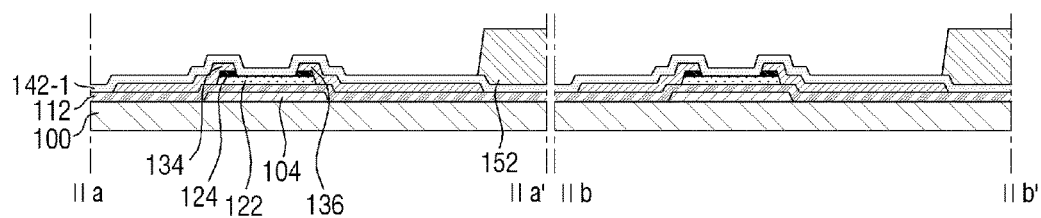

Next, referring to FIG. 20, a color filter 152 is provided or formed on the first protective film 142-1. The color filter 152 may be disposed in the pixel region, and may a red (R) color filter, a green (G) color filter, and a blue (B) color filter. The color filter 152 may include or be made of a photosensitive organic material including a pigment.

The color filter 152 may be formed by photolithography or ink jet printing, or may be formed by other various methods.

Figure 21:
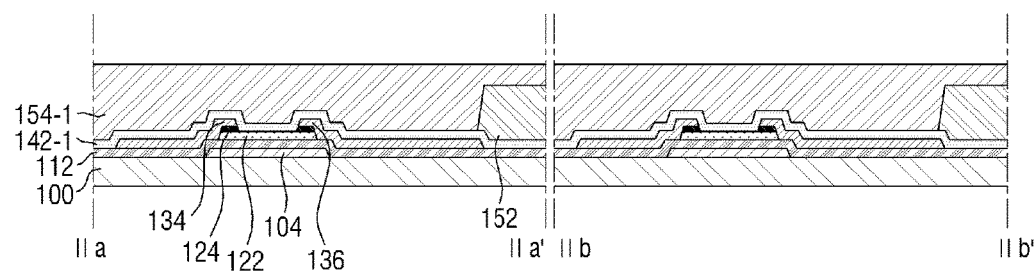

Next, referring to FIG. 21, a first organic film 154-1 is provided or formed on the first protective film 142-1 and the color filter 152. The first organic film 154-1 is provided to have a planarized surface, and may include or be made of a photosensitive material. The first organic film 154-1 may be formed using spin coating or slit coating. In one embodiment, for example, the first organic film 154-1 may be formed using both spin coating and slit coating.

Figure 22:
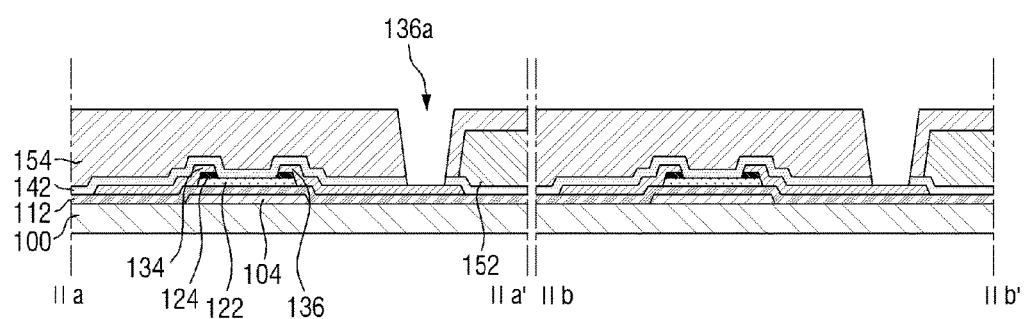

Next, referring to FIG. 22, a contact hole 136a exposing at least a part of the drain electrode 136 is formed through the first protective film 142-1 and the first organic film 154-1. In one embodiment, for example, the contact hole 136a is formed through the first organic film 154-1 to provide an organic layer 154, and, subsequently, the contact hole 136a is further formed through the first protective film 142-1 to provide a first protective layer 142.

Figure 23:
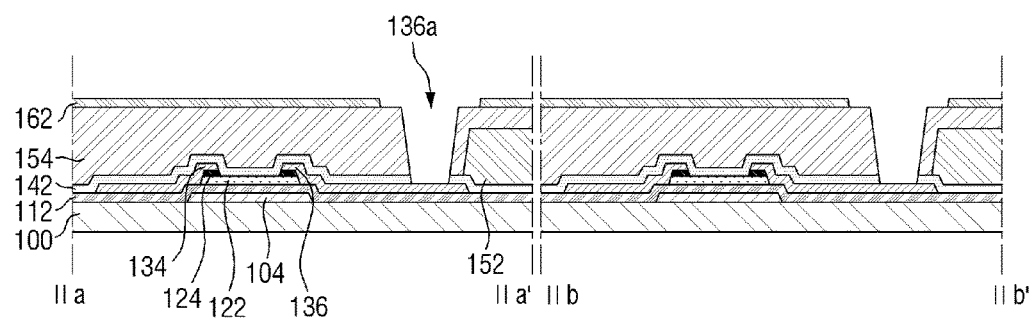

Next, referring to FIG. 23, a common electrode 162 is provided or formed on the organic layer 154. An opening that exposes the region in which the contact hole 136a may be formed through the common electrode 162. The common electrode 162, except for the opening, may be integrally formed as a single unitary and indivisible unit over the entire pixel region surrounded by the gate lines 102 and the data lines 132. The common electrode 162 may include or be made of a transparent conductive material such as ITO or IZO, but the invention is not limited thereto.

Figure 24:
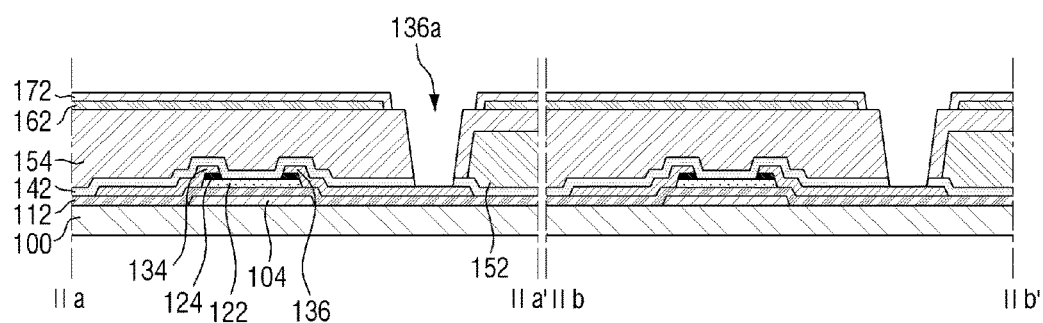

Next, referring to FIG. 24, a second protective layer 172 is provided or formed on the common electrode 162 and the organic layer 154. An opening that exposes the region in which the contact hole 136a may be formed through the second protective layer 172. The second protective layer 172 may be formed by a process of depositing an inorganic material such as silicon nitride or silicon oxide on the common electrode 162 and the organic layer 154, and a process of patterning the deposited inorganic material to expose the region in which the contact hole 136a is formed.

Figure 25:
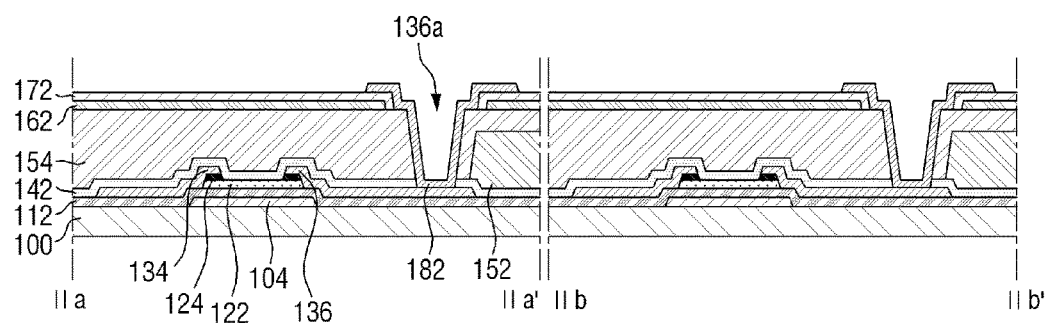

Next, referring to FIG. 25, a pixel electrode 182 is provided or formed on the second protective layer 172 and the organic layer 154. In an embodiment, the pixel electrode 182 may be formed to be in contact with at least a part of the drain electrode 136, which is exposed through the opening formed in the second protective layer 172 and the contact hole 136a formed in the organic layer 154 and the first protective layer 142. Accordingly, in such an embodiment, the pixel electrode 182 may be electrically connected to the drain electrode 136.

Figure 26:
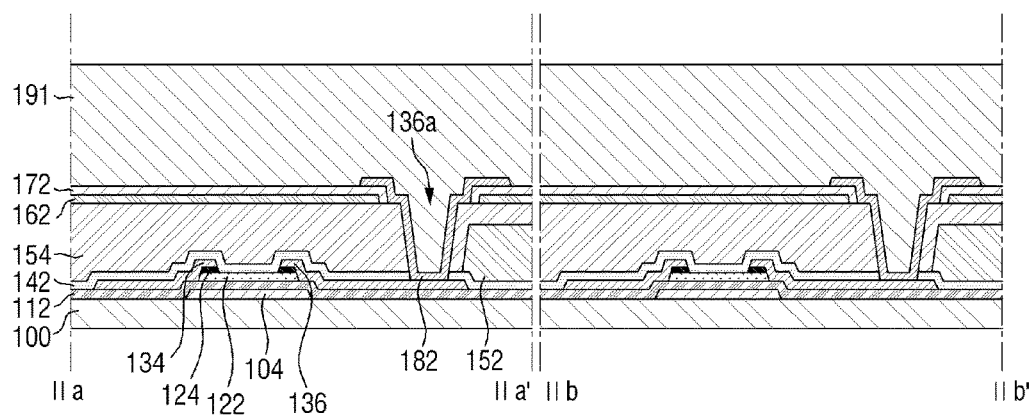

Next, referring to FIG. 26, a light blocking film 191 is provided or formed on the pixel electrode 182 and the second protective layer 172. The light blocking film 191 may include a black organic polymer material including a black dye or pigment, or a metal (metal oxide) such as chromium (chromium oxide). Hereinafter, an exemplary embodiment, where the light blocking film 191 is a negative photoresist, will hereinafter be described in detail with reference to FIGS. 27 and 28. However, the invention is not limited thereto, and in an alternative embodiment, the light blocking film 191 may be a positive photoresist.

Figure 27:
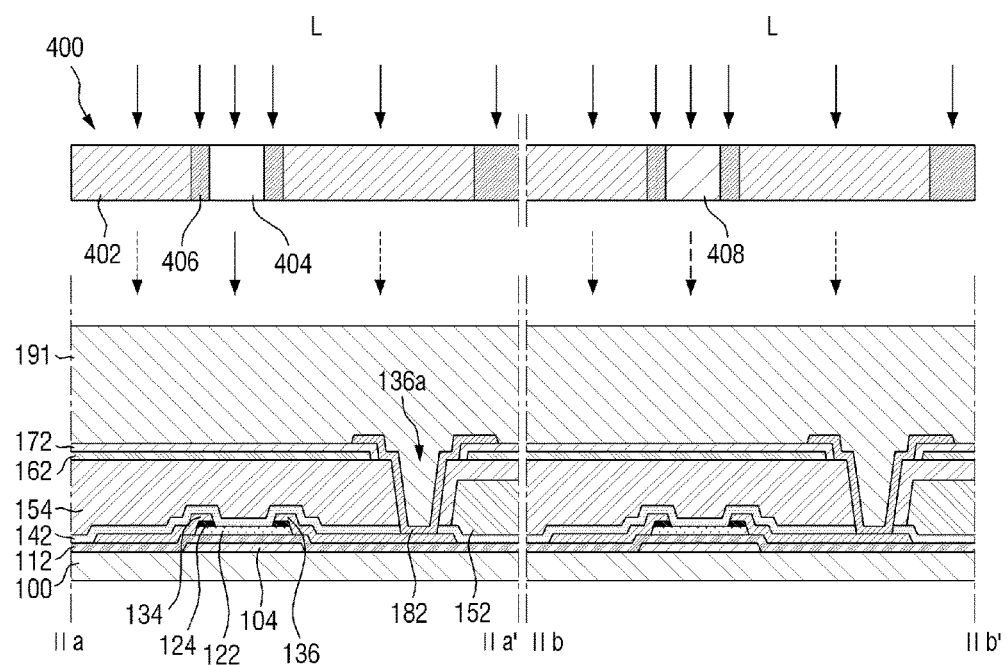

Next, referring to FIG. 27, the light blocking film 191 is patterned by photolithography using an exposure mask 400. The exposure mask 400 may include a first halftone portion 402, a second halftone portion 408, an open portion 404, and a blocking portion 406.

The transmittance of irradiation light (L) may become higher in order of the open portion 404, the second halftone portion 408, the first halftone portion 402 and the blocking portion 406. In one embodiment, for example, as shown in FIG. 27, a part of the irradiation light (L) may be transmitted through the first halftone portion 402 and the second halftone portion 408, and the transmittance (for example, about 20%) of irradiation light (L) through the first halftone portion 402 may be lower than the transmittance (for example, about 50%) of irradiation light (L) through the second halftone portion 408. The entire irradiation light (L) may be transmitted through the open portion 404, but the invention is not limited thereto. The entire irradiation light (L) may be blocked through the blocking portion 406.

Figure 28:
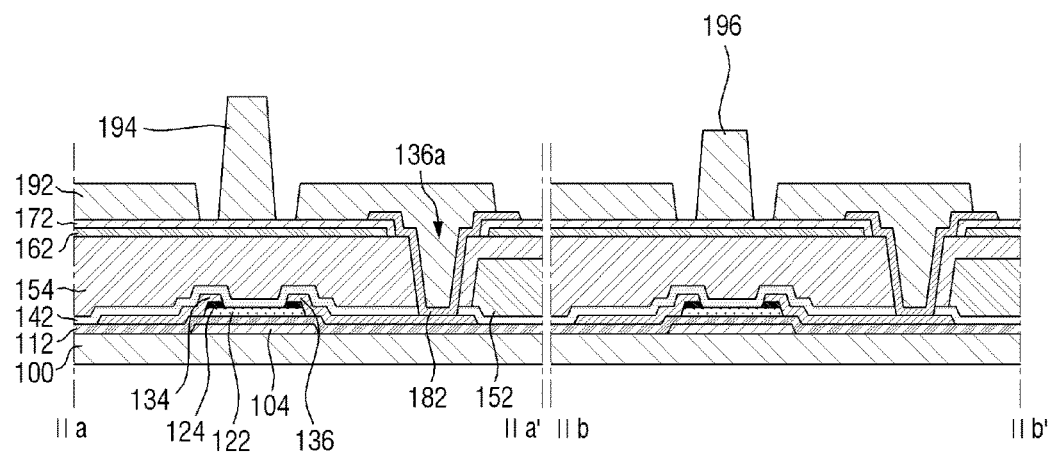

Next, referring to FIG. 28, the light blocking film 191 corresponding to the open portion 404 may be formed into a main column spacer 194 by photolithography using the exposure mask 400. The light blocking film 191 corresponding to the first halftone portion 402 may be formed into a light blocking pattern 192. The light blocking film 191 corresponding to the second halftone portion 408 may be formed into a sub column spacer 196. The light blocking film 191 corresponding to the blocking portion 406 may be removed to form spaces between the main column spacer 194 and light blocking pattern 192 and between the sub column spacer 196 and light blocking pattern 192.

If the column spacer array (194, 196) and the light blocking pattern 192 are integrally formed as a single unitary and indivisible unit at the same time using a halftone mask, the CD bias of the column spacer array (194, 196) may increase due to the exposure intensity of a halftone portion, compared to a case when only the column spacer array (194, 196) is formed. That is, the difference between the designed size of the mask and the actual size of the column spacer array (194, 196) may increase. When the CD bias of the column spacer array (194, 196) increases, the size of the BCS pattern increases, and a high resolution may not be effectively realized.

In an embodiment of the invention, when the column spacer array (194, 196) is formed together with the light blocking pattern 192, the column spacers 194 and 195 may be spaced apart from the light blocking pattern 192, and may be formed in the shape of an island surrounded by the light blocking pattern 192. Therefore, in such an embodiment, similarly to the case where only the column spacer array (194, 196) is formed, the CD bias of the column spacer array (194, 196) may be substantially reduced compared to the case where the column spacer array (194, 196) and the light blocking pattern 192 are integrally formed as a single unitary and indivisible unit using a halftone mask.

Figure 29:
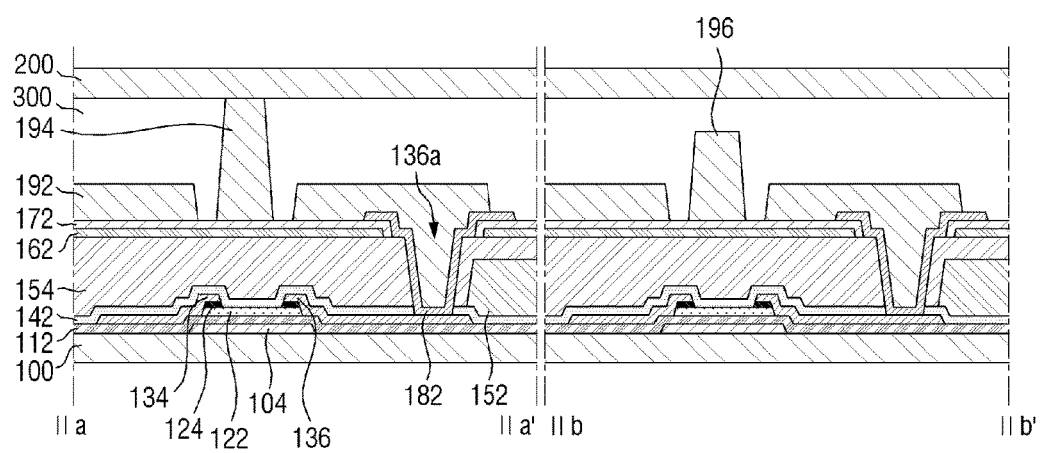

Next, referring to FIG. 29, an alignment film (not shown) is provided or formed on each of the first substrate 100 and the second substrate 200. Subsequently, liquid crystal molecules (not shown) having positive dielectric anisotropy or negative dielectric anisotropy are applied to the first substrate 100 to form a liquid crystal layer 300. Subsequently, the first substrate 100 provided with the liquid crystal layer 300 is coupled with the second substrate 200.

Next, a method of manufacturing the above-described liquid crystal display device 20, according to an alternative embodiment of the invention.

Such an alternative embodiment of the method of manufacturing the liquid crystal display device 20 is substantially the same or similar to an embodiment of the method of manufacturing the liquid crystal display device 20 described above with reference to FIGS. 15 to 29, except for the patterning process of the light blocking film 191. Hereinafter, the method of manufacturing the liquid crystal display device 20, according to an embodiment of the invention, will be described based on such differences.

Figure 30:
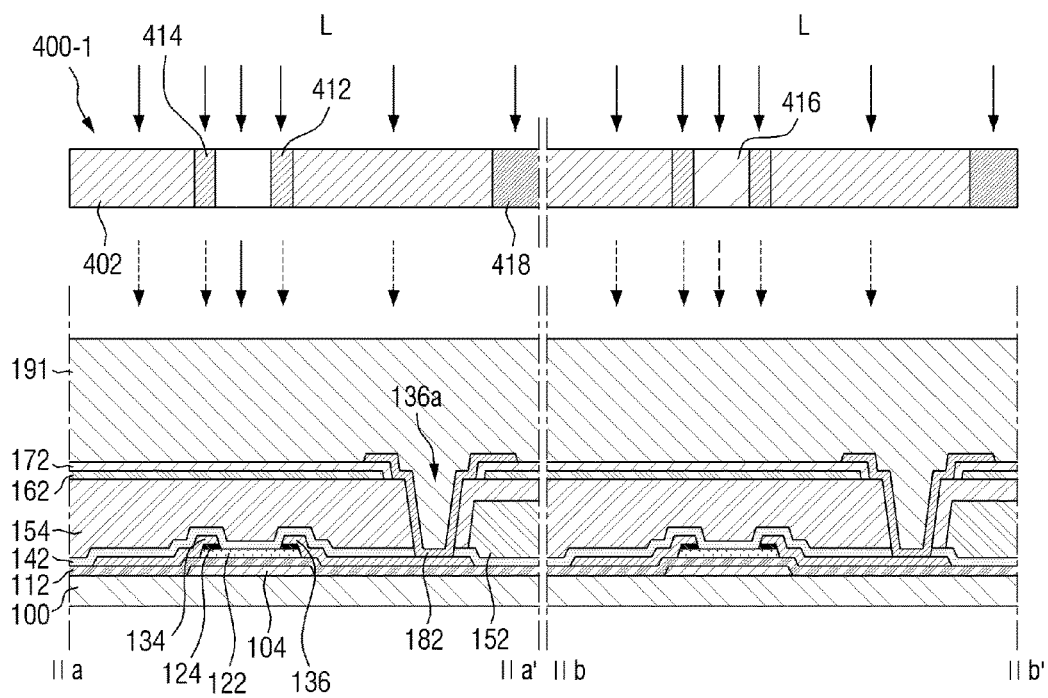
FIG. 30 is a cross-sectional view showing the patterning process of a light blocking film in a method of manufacturing a liquid crystal display device, according to an alternative embodiment of the invention.

FIG. 30 is a cross-sectional view showing a patterning process of a light blocking film in the method of manufacturing a liquid crystal display device according to an alternative embodiment of the invention.

Referring to FIG. 30, in an embodiment of the method of manufacturing a liquid crystal display device according to the invention, the light blocking film 191 is provided or formed on the pixel electrode 182 and the second protective layer 172, and is then patterned by photolithography using an exposure mask 400-1. The exposure mask 400-1 may include a first halftone portion 410, a second halftone portion 416, a third halftone portion 414, an open portion 412, and a blocking portion 418.

The transmittance of irradiation light (L) may become higher in order of the open portion 412, the second halftone portion 416, the first halftone portion 410, the third halftone portion 414, and the blocking portion 418. In one embodiment, for example, as shown in FIG. 30, a part of the irradiation light (L) may be transmitted through the first halftone portion 410, the second halftone portion 416 and the third halftone portion 414, and the transmittance of irradiation light (L) may become higher in order of the second halftone portion 416, the first halftone portion 410 and the third halftone portion 414. The entire irradiation light (L) may be transmitted through the open portion 412, but the invention is not limited thereto. The entire irradiation light (L) may be blocked through the blocking portion 418.

Referring to FIG. 30 and back to FIG. 10, the light blocking film 191 corresponding to the open portion 412 may be formed into a main column spacer 194a by photolithography using the exposure mask 400-1. The light blocking film 191 corresponding to the first halftone portion 410 may be formed into a light blocking pattern 192a. The light blocking film 191 corresponding to the second halftone portion 416 may be formed into a sub column spacer 196a. The light blocking film 191 corresponding to the third halftone portion 414 may be formed into a first connecting member 198a and a second connecting member 199a. The light blocking film 191 corresponding to the blocking portion 418 may be removed.

As described above, in embodiments of the display device according to the invention, the size of a BCS pattern is decreased, and a high resolution may be effectively realized.

Further, in embodiments of the method of manufacturing a display device according to the invention, a display device with a high resolution may be effectively manufactured by decreasing the size of a BCS pattern.

Although some embodiments of the invention have been disclosed for illustrative purposes, those skilled in the art will appreciate that various modifications, additions and substitutions are possible, without departing from the scope and spirit of the invention as disclosed in the accompanying claims.

What is claimed is:

1. A display device, comprising:
 a first substrate;
 a second substrate disposed opposite to the first substrate;
 a light blocking pattern disposed on the first substrate; and
 a column spacer which is disposed on the first substrate and maintains a distance between the first substrate and the second substrate,
 wherein
 the light blocking pattern and the column spacer are spaced apart from each other,
 the column spacer has an island shape surrounded by the light blocking pattern, and
 the column spacer and a portion of the light blocking pattern are directly disposed on a same layer.

2. The display device of claim 1, wherein the column spacer does not overlap the light blocking pattern in a plan view, and wherein a distance between the light blocking pattern and the column spacer in a plan view is in a range of about 2 μm to about 10 μm.

3. The display device of claim 1, wherein
 when a space between the light blocking pattern and the column spacer is viewed in plan, an outer boundary and an inner boundary of the space have a circular shape.

4. The display device of claim 1, wherein
 when a space between the light blocking pattern and the column spacer is viewed in plan, an outer boundary of the space has a circular shape, and an inner boundary of the space has a polygonal shape.

5. The display device of claim 1, wherein
 when a space between the light blocking pattern and the column spacer is viewed in plan, an outer boundary and an inner boundary of the space have a polygonal shape.

6. The display device of claim 1, wherein
 when a space between the light blocking pattern and the column spacer is viewed in plan, an outer boundary of the space has a polygonal shape, and an inner boundary of the space has a circular shape.

7. The display device of claim 1, wherein
 the column spacer comprises a main column spacer and a sub column spacer, and
 an end of the main column spacer adjacent to the second substrate is closer to the second substrate than an end of the sub column spacer adjacent to the second substrate is.

* * * * *